(12) United States Patent
Schlarb et al.

(10) Patent No.: US 8,949,789 B2
(45) Date of Patent: Feb. 3, 2015

(54) ADAPTABLE BUSINESS OBJECTS

(75) Inventors: Uwe Schlarb, Oestringen (DE); Stefan Baeuerle, Rauenberg-Rotenberg (DE)

(73) Assignee: SAP SE, Walldorf (DE)

( * ) Notice: Subject to any disclaimer, the term of this patent is extended or adjusted under 35 U.S.C. 154(b) by 214 days.

(21) Appl. No.: 13/584,585

(22) Filed: Aug. 13, 2012

(65) Prior Publication Data

US 2014/0047412 A1    Feb. 13, 2014

(51) Int. Cl.
  *G06F 9/44*     (2006.01)
  *G06F 17/00*    (2006.01)
  *G06F 15/16*    (2006.01)

(52) U.S. Cl.
  USPC .......................... 717/122; 707/600; 709/203

(58) Field of Classification Search
  CPC ............... G06F 8/10; G06F 8/20; G06F 8/30; G06F 8/34; G06F 8/36; G06F 8/71
  See application file for complete search history.

(56) References Cited

U.S. PATENT DOCUMENTS

| | | | |
|---|---|---|---|
| 6,601,233 B1* | 7/2003 | Underwood | 717/102 |
| 2004/0088678 A1* | 5/2004 | Litoiu et al. | 717/104 |
| 2004/0098358 A1* | 5/2004 | Roediger | 706/46 |
| 2006/0143220 A1* | 6/2006 | Spencer | 707/102 |
| 2009/0064090 A1 | 3/2009 | Anonsen et al. | |
| 2009/0328067 A1 | 12/2009 | Srinivasan et al. | |
| 2010/0287145 A1* | 11/2010 | Zeier et al. | 707/705 |
| 2011/0153501 A1* | 6/2011 | Agarwal et al. | 705/51 |
| 2011/0179110 A1* | 7/2011 | Soloway | 709/203 |
| 2012/0005179 A1 | 1/2012 | Thimmel et al. | |

FOREIGN PATENT DOCUMENTS

EP    2159744 A1    3/2010

OTHER PUBLICATIONS

European Search Report dated Aug. 1, 2013, for European Patent Application No. 12007730.0.

* cited by examiner

*Primary Examiner* — Don Wong
*Assistant Examiner* — Mohammad Kabir
(74) *Attorney, Agent, or Firm* — Mintz Levin Cohn Ferris Glovsky and Popeo, P.C.

(57) ABSTRACT

An adaptable business object can include a generic, content-free, and meaning-free skeleton business object, which can be used to create a new business object without requiring that a user be proficient in a development environment such as a software development kit (SDK). Definitions of a first field to be added to a header of the adaptable business object and a second field to be added to an item node of the adaptable business object can be received via a field extensibility tool, and a terminology tool can adapt the adaptable business object by storing metadata relating to the terminology of the business object in a metadata repository such that screen and section titles for at least one user interface screen supported by the new business object can be presented at runtime using the stored metadata.

19 Claims, 9 Drawing Sheets

ADAPTABLE BUSINESS OBJECTS

TECHNICAL FIELD

The subject matter described herein relates to adaptable business objects.

BACKGROUND

A provider of an enterprise resource planning (ERP) or other business software architecture can provide to partners and customers the ability to extend or adapt the software architecture to individual requirements. In this context, a customer is a purchaser, licensee, user, etc. of a business software architecture, and a partner is a developer or vendor of business software functionality that can integrated with a core software platform of the business software architecture to provide additional features or enhance existing features of the core software platform. Some degree of flexibility can in some examples be provided via field extensibility, which can enable the addition of extension fields (e.g. a new field "Event") to a business object (e.g. a sales order). Extension fields can be made visible on screens, in form forms, in search forms, in analytics reports, in migration services, and the like. It can also be possible to add extension fields to multiple business objects and to initiate a transfer of the extension field content during runtime (e.g. as part of process oriented field extensibility).

SUMMARY

Consistent with one or more implementations of the current subject matter, creation of new business objects, which can include user interfaces, print forms, analytics reports, or the like, can be carried out by a user via a simple adaptation interface that does not require proficiency with a development environment such as a software development kit. An adaptable business object can be provided to a user as a generic, content-free, and meaning-free skeleton business object, and the user can provide definitions of a first field to be added to a header of the adaptable business object and a second field to be added to an item node of the adaptable business object via a field extensibility interface. Terminology of the adaptable business object can be adapted, for example by storing metadata relating to the terminology, including the first field and the second field, in a metadata repository such that screen and section titles for at least one user interface screen supported by the new business object can be determined at runtime using the stored metadata.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

While the flexibility of an extension field addition approach can be very powerful, it can be insufficient for more complicated customer needs, such as for example creation of new business objects with user interfaces, print forms, analytics reports, and the like. Such adaptations to a business software architecture can, in conventional approaches, require the use of a development environment, such as for example a software development kit (SDK) or other set of software development tools that allows for the creation of applications for a certain software package, software framework, hardware platform, computer system, video game console, operating system, or similar platform. Typical development environments are sufficiently complex and foreign to typical business users that their use can require either a significant amount of internal training and effort and/or contracting with an external partner (e.g. a consultant or the like) who is familiar with the workings of a development environment. Such activities can present a significant barrier to making such enhancements, for example in terms of time, effort, and cost.

Implementations of the current subject matter can allow creation of new business objects without the use of a development environment. Instead, a user, such as for example a key user or the like at a customer organization using the business software architecture can perform such tasks in a very simple manner that requires a very low "learning curve" due to some commonalities with field extensibility features that are more likely to be familiar to the user. This capability can be provided via an adaptable business object, which can include a content free and meaning free skeleton business object.

Consistent with such an approach, a set of one or more adaptable business objects can be provided as part of an installation package, value added upgrade, or the like or a business software architecture. These adaptable business objects can each include a "root" node (which can include a data field), and an "item" node (which can include a data field). Each adaptable business object can also include peripheral features and functions that are typically required for a fully operative business object, such as for example a user interface (UI), search forms, print forms, reports, migration services, Web services (e.g. for supporting further extensions), extension scenarios (e.g. to support process oriented field extensibility), and the like. Each of these peripheral features and functions can be very simple for a user to implement since they need only provide a few fields such as a header and an item field or the like. An adaptable business object consistent with implementations of the current subject matter can also support field extensibility such that a customer-created business object based on an adaptable business object can be extended using conventional field extensibility mechanisms. A terminology adaptation can be integrated into field extensibility dialog to enable use of business objects created from adaptable business objects in this manner. For example, identifier fields which point to other business objects can allow creation of links between standard business objects (e.g. those included as part of a core software platform) and business objects created from adaptable business objects as well as between two business objects created from adaptable business objects.

Use of adaptable business objects consistent with implementations of the current subject matter can provide one or more advantages over previously available approaches. Such advantages can include, without limitation, the ability of a customer to easily adopt this functionality with almost no learning curve provided the customer already is already familiar with the process of adding extension fields to business objects. Additionally, many use cases can be covered with only a few types of adaptable business objects, for example where a main requirement from a customer is to create a new business object without a complicated logic behind it. In conventional approaches, a customer would likely need to implement such use cases via a development environment, SDK, or the like.

Figure 2:
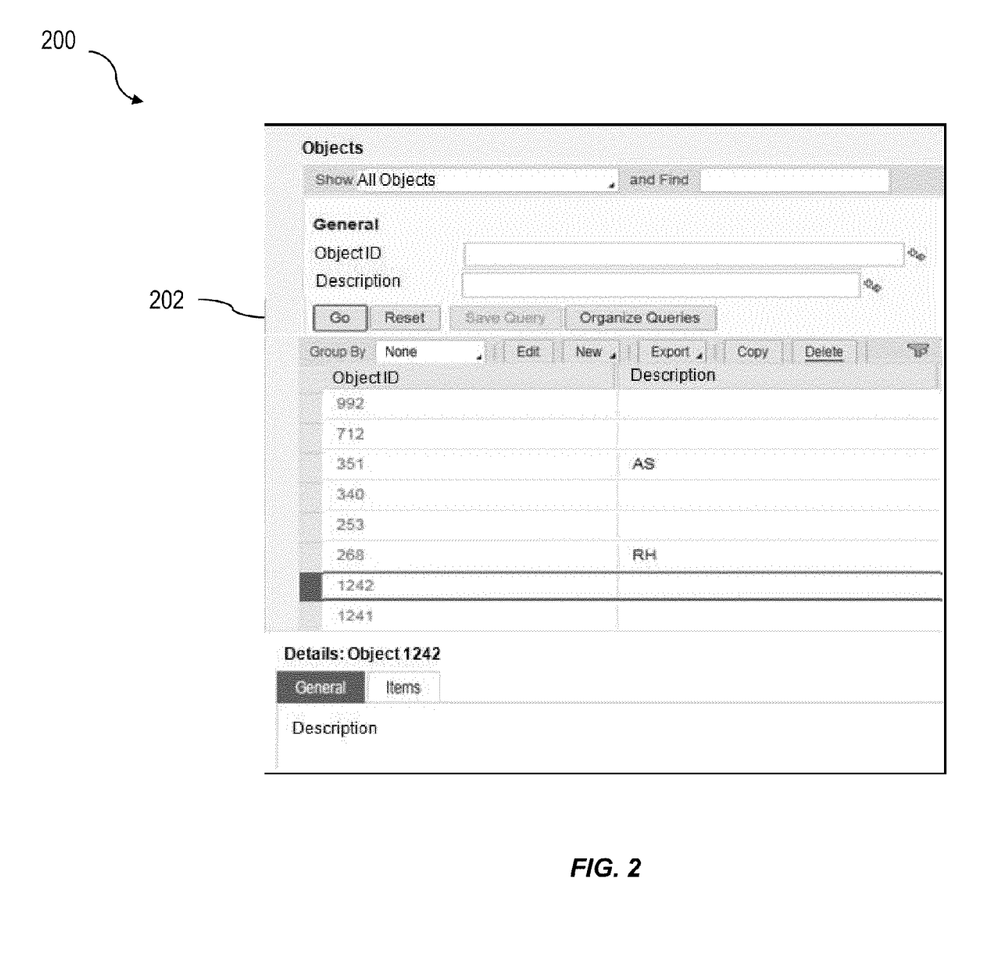

An adaptable business object consistent with implementations of the current subject matter can, as noted above, fulfill various requirements for standard (e.g. predefined) business objects while also being very straightforward for a user or key user at the customer side to modify for a desired end result. For example, an adaptable business object can provide a human readable identifier for each node, which can also be used as an alternative key, and can contain at least some system administrative data. An adaptable business object can include field extensibility features (see FIG. 2) to allow field extensibility in further steps.

Figure 1:
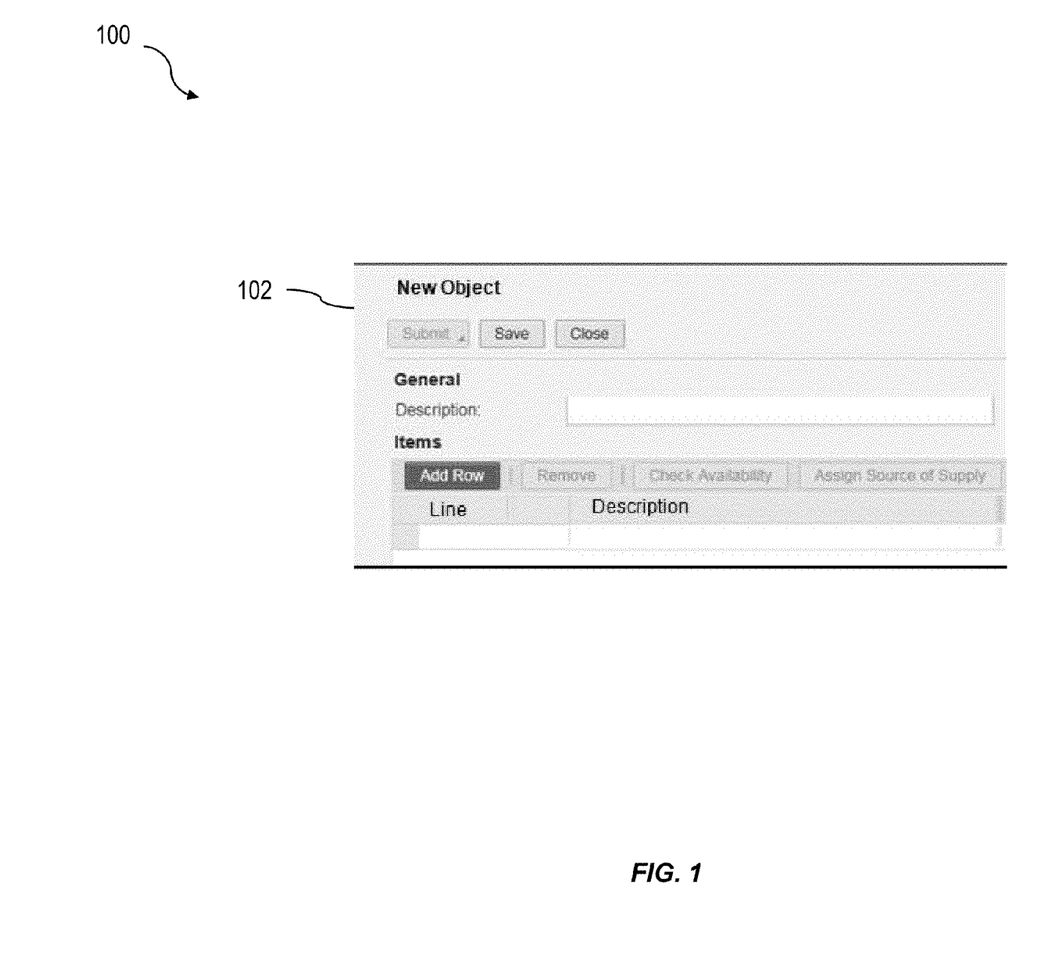
FIG. 1 through FIG. 5 show screen views illustrating features consistent with implementations of the current subject matter.

The user interface provided as part of an adaptable business object can provide all functionality consistent with common UIs available within the business software architecture. For example, a work center can be provided to one or more of an object instance floorplan (OIF) for maintaining data of the business object; an object work list (OWL) containing at least one find form, a result list, a detail pane, or the like; a guided activity floorplan (GAF) for allowing creation of an instance in multiple steps in a wizard-like way, a quick activity floorplan (QAF) for allowing creation of an instance quickly from one screen; a fact sheet for allowing display the of the main data of the business object; and the like. The corresponding UIs can be relatively simple, such as for example the quick activity floorplan 102 shown in the screen view 100 of FIG. 1, and can be built directly on the adaptable business subject without the use of controller business objects.

To prepare an adaptable business object for field extensibility, the user interfaces included within the adaptable business object can provide UI anchors to allow the addition of extension fields at the customer that can be resolved to one or more corresponding underlying data structures within the adaptable business object. Additionally, titles of UI screens can be read from a configuration table, which can allow replacement of the general term "object" with customer-specific terminology.

An adaptable business object can also provide an OWL with corresponding search capabilities. In other words, the adaptable business object in the metadata repository system of the software architecture can have its nodes and the fields set to a "replication allowed" state such that they are searchable, for example using TREX or some other language. An OWL consistent with implementations of the current subject matter can optionally be built using the controller infrastructure (e.g. system architecture design language or SADL-based UIs) such that building FSI views can be avoided. An example of a simplified OWL 202 is shown in the screen view 200 of FIG. 2.

A forms message type can be created as part of an adaptable business object to expose the data of the business object. In addition, a print form with a minimal layout can be provided to be editable using a forms editor as can a report format for use in reporting data stored within the created business object. Service interfaces (A2X) and/or reference fields can be defined for a forms message type in the metadata repository system, for analytics, and the like. The defined service interfaces can optionally provide functionality such as creating an instance, updating an instance, reading an instance, querying an instance, or the like and can advantageously be implemented using a maintain bundle framework to allow an optimal extension technique with minimal performance overhead. Service interfaces can be exposed in a migration workbench or the like to ensure a comfortable upload of the business object instances.

Consistent with some implementations of the current subject matter, each adaptable business object can provide an action allowing creation of a subsequent adaptable BO from it. This feature can include also a provisioning of document flow. Reference fields for business object to business object communication can be defined for service interfaces, for example in the metadata repository system in MDRS.

An extension scenario, which can be activated by a key user, can be provided, in association with adaptable business objects having one or more features in common with implementations of the current subject matter.

Certain features and capabilities of the subject matter discussed herein can be better understood by reference to an example implementation in which a new business object is required to handle description of students (for example in a business software architecture used in administration of school records). For documentation purposes the courses a student takes are recorded. The data can be provided from a third party system and must be uploaded.

Figure 3:
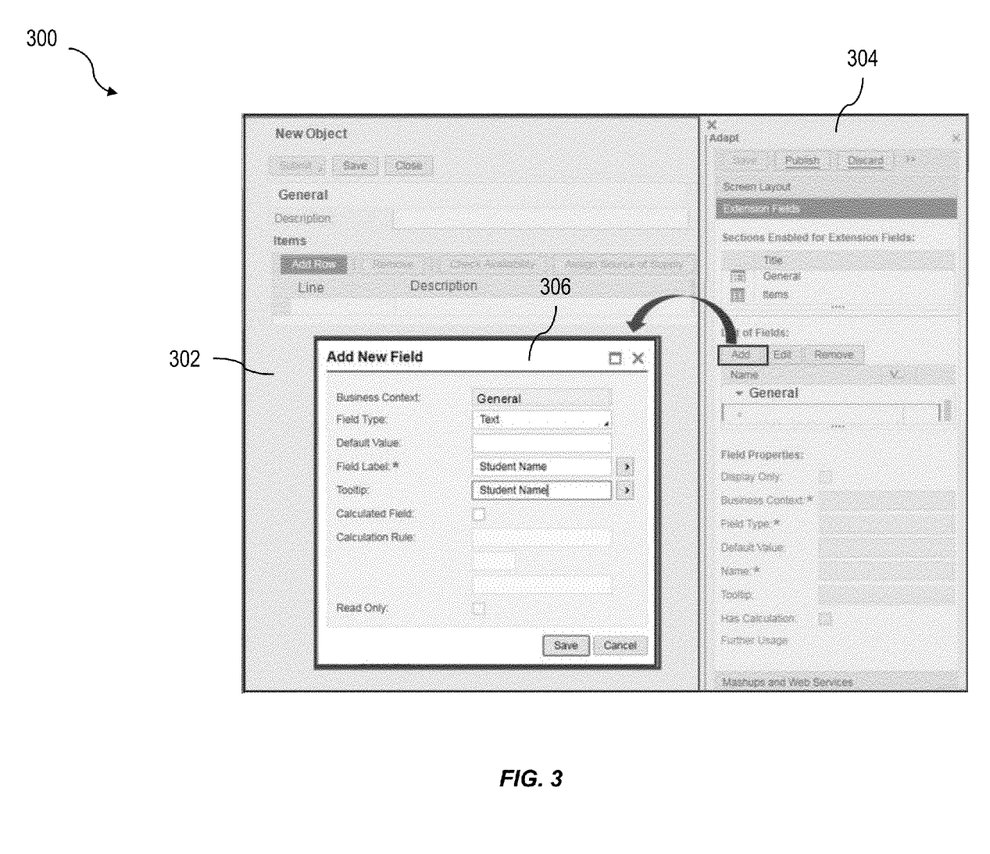

As shown in the screen view 300 of FIG. 3, a user adding a new business object based on an adaptable business object can enter a work center 302 for an adaptable business object. A field extensibility tool 304 can be initiated in an additional frame on the screen view 300. In this manner, a new field can be added to a header and to an item node for the adaptable business object, for example via a new field dialog box 306. As shown in the screen view 400 of FIG. 4, the terminology of the adaptable business object can be adapted, for example using a terminology tool 402 accessed via a link or other UI element 404 in the field extensibility tool 304. Metadata defining the aspects of the new business object created from the adaptable business object can be stored in a client dependent table (e.g. a table accessible to the customer) and can be used during runtime to determine screen and section titles for the screens. An adapted quick activity floorplan 502 (e.g. as shown in the screen view 500 of FIG. 5) can be created based on the adapted business object according to the needs of the customer. The extension fields displayed in the adapted quick activity floorplan 502 can also be made available on other screens, for example in an OWL.

Figure 4:
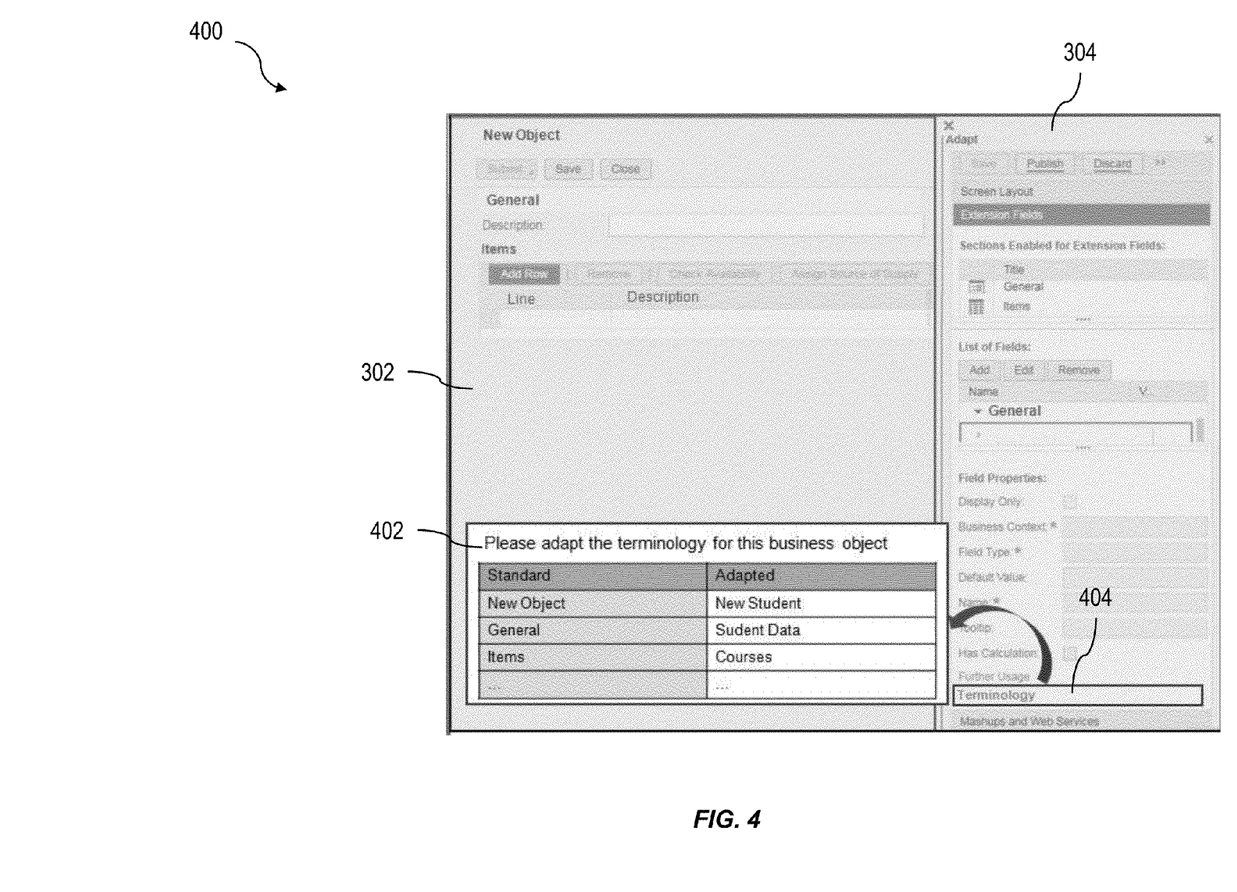
Figure 5:
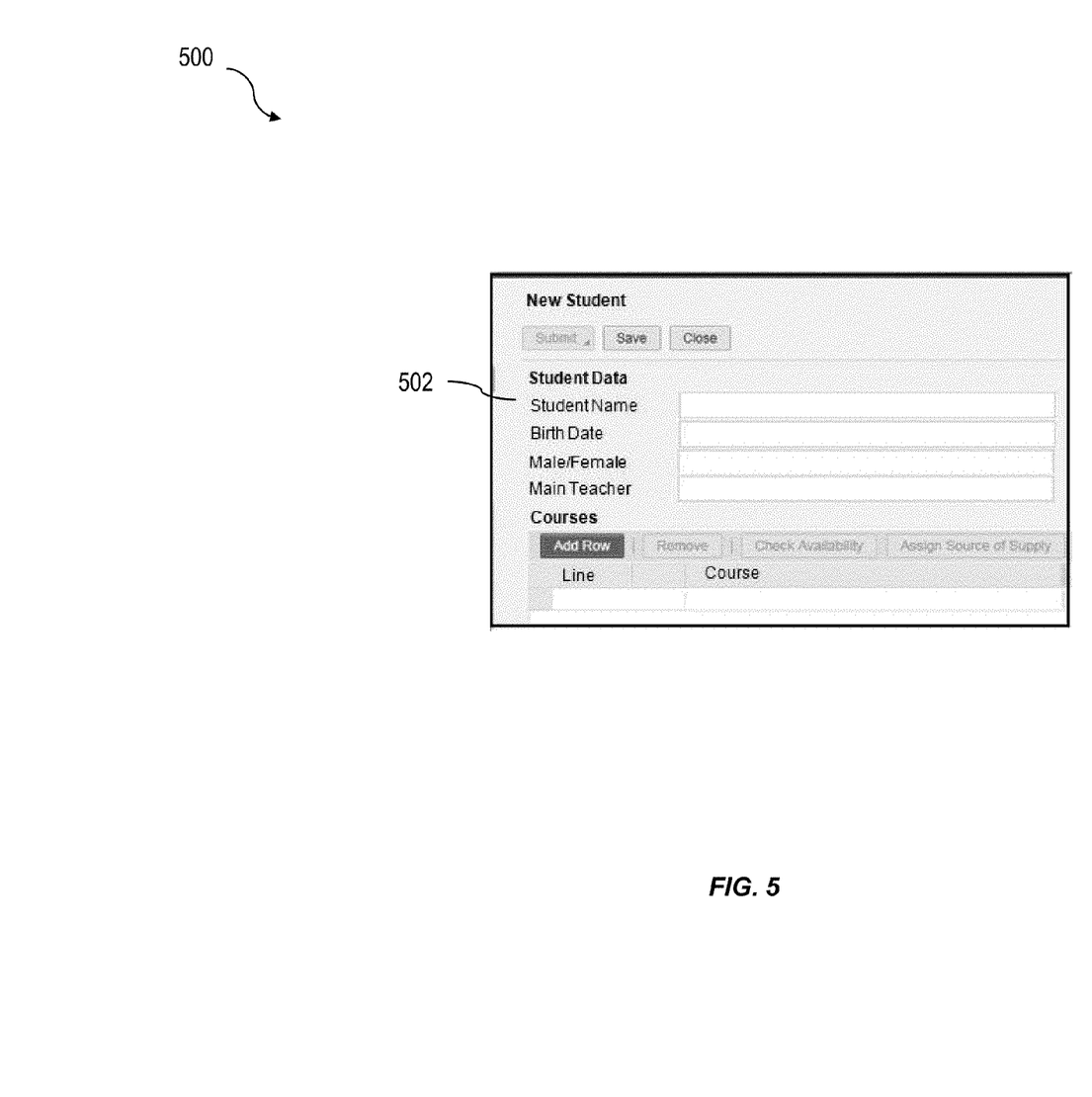

In further reference to the features explained by the example of FIG. 3, FIG. 4, and FIG. 5, a key user can make the extension fields available in forms, reports, enterprise search (if available), extension scenarios, and the like. For example, if the customer wishes to be able to print out student information, the print form can be adapted correspondingly. Extension fields can also be added to reports, defined for the adaptable business objects in a similar manner to what is described above for the QAF 502.

A new extension field can also be added along a scenario, which has been defined for the adaptable business objects. For example, a key user can, in a migration workbench, select an adaptable business object for upload. When extension fields have been added, a dialog can query the user whether the extension fields should be added to the migration service and thereby make the necessary extension fields available for upload as needed.

A key user or other user at a customer can integrate an adapted business object in some implementations of the current subject matter by adding an identifier extension field to an existing business subject that is part of the core software platform. Doing so can automatically provide a corresponding search help for this input field in the user interface.

Figure 6:
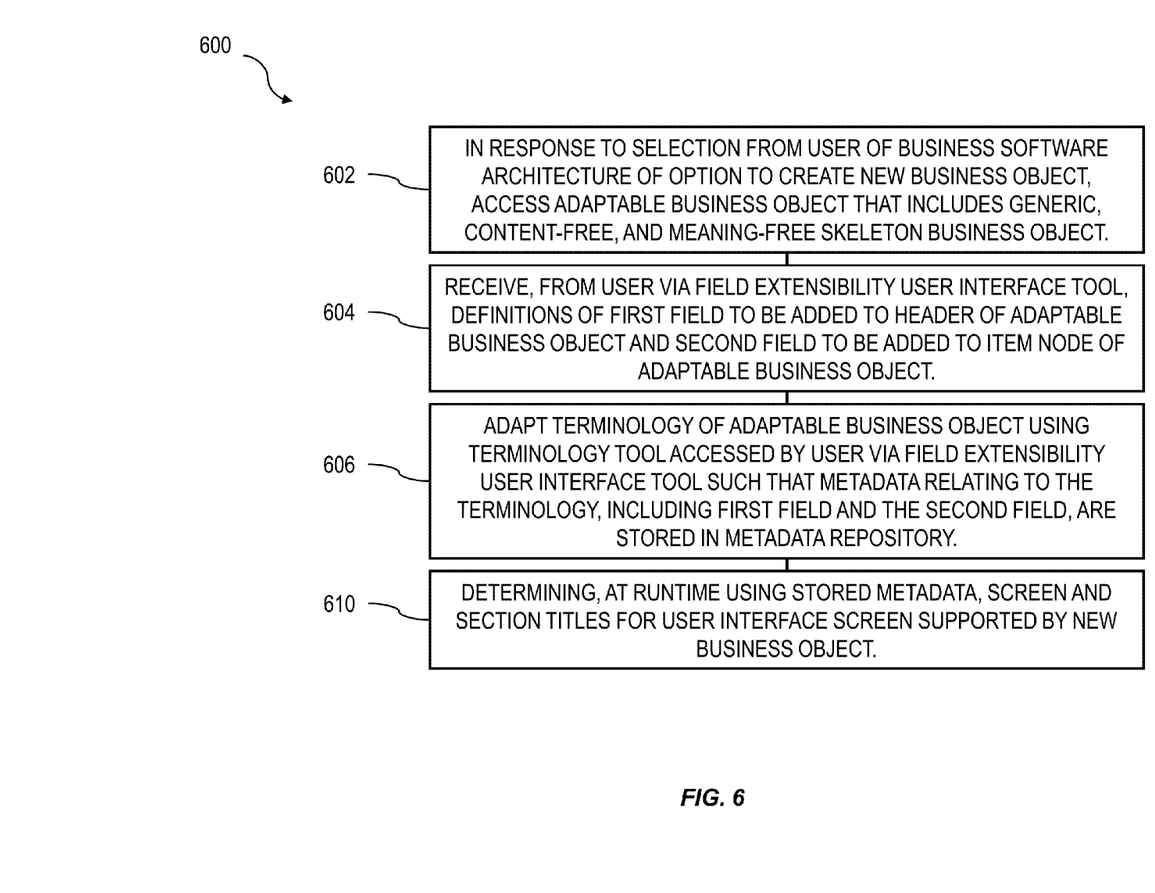
FIG. 6 is a process flow diagram illustrating aspects of a method having one or more features consistent with implementations of the current subject matter.

FIG. 6 shows a process flow chart 600 illustrating method features, one or more of which can be included in an implementation of the current subject matter. At 602, in response to a selection from a user of a business software architecture of an option to create a new business object, an adaptable business object is accessed. The adaptable business object can include a generic, content-free, and meaning-free skeleton business object. At 604, definitions of a first field to be added to a header of the adaptable business object and a second field to be added to an item node of the adaptable business object are received from the user via a field extensibility user interface tool. The terminology of the adaptable business object is adapted at 606 using a terminology tool accessed by the user via the field extensibility user interface tool. The adapting can include storing metadata relating to the terminology, including first field and the second field, in a metadata repository. At 610, screen and section titles for at least one user interface screen supported by the new business object are determined at runtime using the stored metadata.

Figure 7:
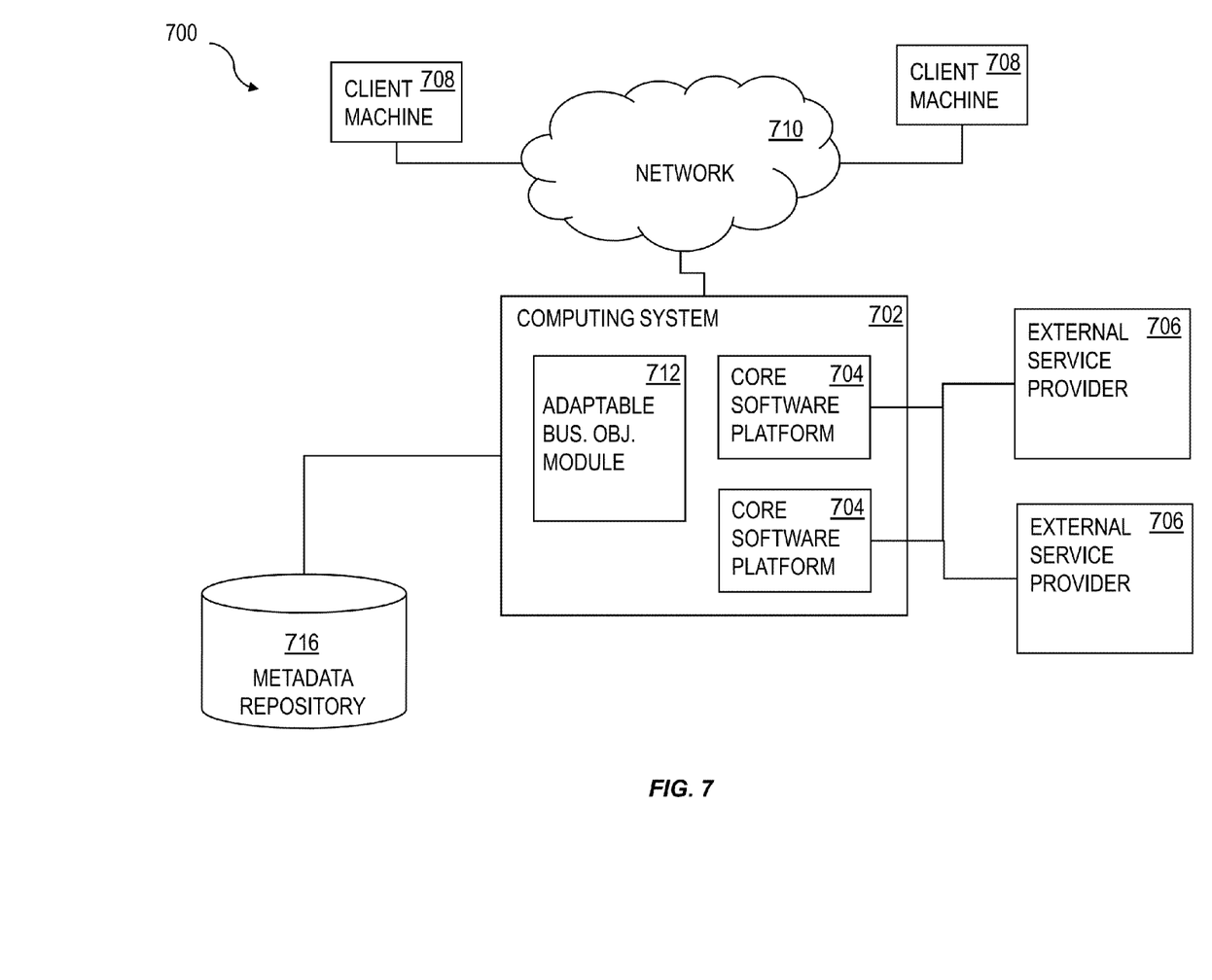
FIG. 7 is a diagram illustrating aspects of an example of a software architecture showing features consistent with implementations of the current subject matter.

The core software platform of an enterprise resource planning (ERP) system, other business software architecture, or other database functionality can in some implementations be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 7 shows a diagram of a system consistent with such an implementation. A computing system 702 can include one or more core software platform modules 704 providing one or more features of the business software system. In some implementations, the computing system 702 can be an application server. The computing system 702 can also aggregate or otherwise provide a gateway via which users can access functionality provided by one or more external service providers 706. Examples of external service providers 706 can include one or more computing systems supporting database functionality or other software functionality created or provided from a partner or other third party software developer. This external service provider database functionality or other software functionality can be provided over either direct or networked connections if the one or more external provider computing systems are separate from the computing system 702 that includes one or more core software platform modules 704. Alternatively, the external service provider database functionality or other software functionality can be hosted on the computing system 702 that includes the one or more core software platform modules 704.

Client machines 708 can access the computing system, either via a direct connection, a local terminal, or over a network 710 (e.g. a local area network, a wide area network, a wireless network, the Internet, or the like). An adaptable business object module 712 or multiple such modules can execute on the computing system 702, on one or more separate systems, or any combination thereof to perform one or more of the adaptable business object management operations discussed in greater detail elsewhere herein. For the remainder of this disclosure, the adaptable business object module 712 will be discussed in the singular. However, it will be readily understood that one or more features of the methods, techniques, approaches, etc. relating to functionality ascribed to a single extension field naming module 712 can be performed by multiple modules, which can be implemented within a single system that includes one or more processors or on multiple systems that each include one or more processors. The adaptable business object module 712 can access one or more metadata repositories 716 (referred to generally herein in the singular as a metadata repository 716), which can retain one or more of metadata for use by at least one of the one or more core software platform modules 704 and the database functionality or other software functionality provided by one or more external service providers 706. The one metadata repository 716 can also retain metadata relating to the core business object model in a first (e.g. a foundation) layer of the layer business software architecture and metadata relating to the cross-layer extensions to the core business object model. The metadata repository 716 can also store objects or other elements, such as for example business objects, metadata objects, or the like. These objects or other elements can include definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some implementations, a business object or other metadata object can include a template definition of a standard business process or other related functionality. The template definition can optionally be modified via one or more extensions that can also be stored in the one or more repositories 716. The one or more repositories can also include storage for data relating to the business or other aspects of the organization.

Smaller organizations can also benefit from use of business software functionality. However, such an organization may lack the necessary hardware resources, IT support, and/or consulting budget necessary to make use of a standalone business software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 8:
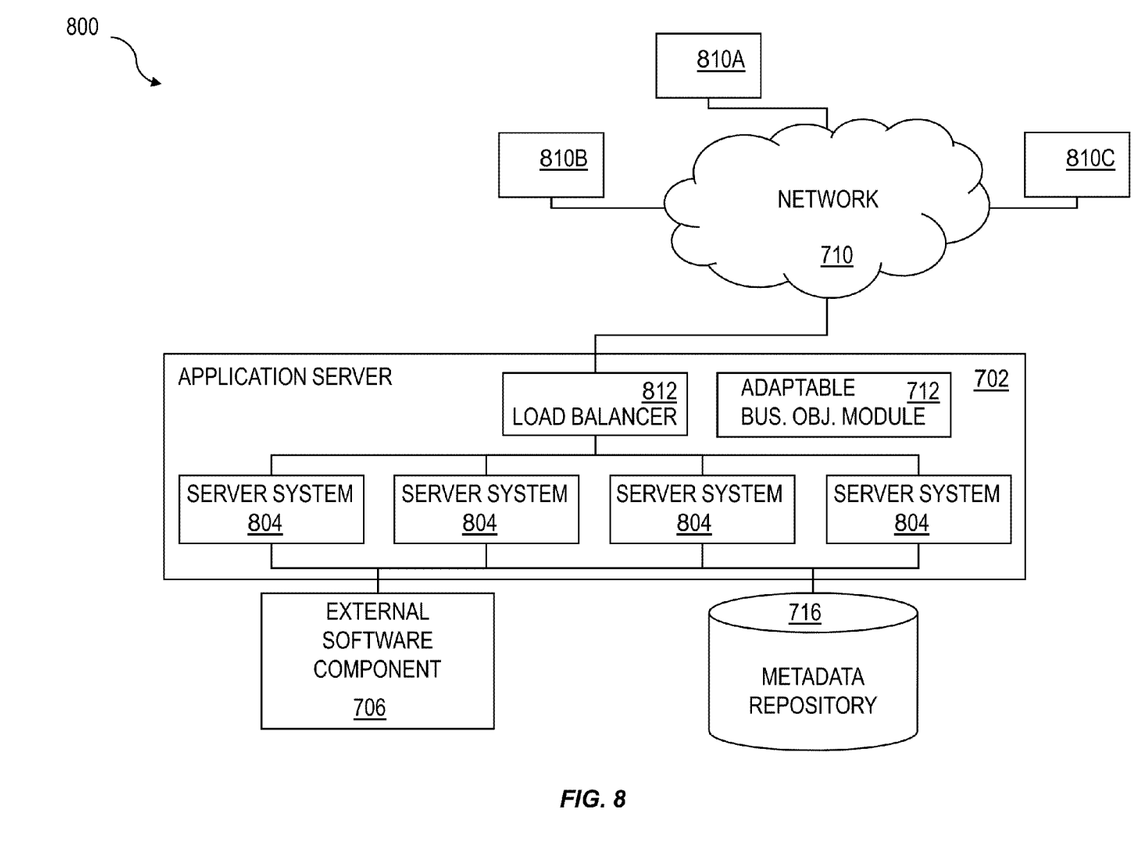
FIG. 8 is a diagram illustrating aspects of another example of a software architecture showing features consistent with implementations of the current subject matter.

FIG. 8 shows a block diagram of a multi-tenant implementation of a software delivery architecture 800 that includes an application server 802, which can in some implementations include multiple server systems 804 that are accessible over a network 806 from client machines operated by users at each of multiple organizations 810A-810C (referred to herein as "tenants" of a multi-tenant system) supported by a single software delivery architecture 800. For a system in which the application server 802 includes multiple server systems 804, the application server can include a load balancer 812 to distribute requests and actions from users at the one or more organizations 810A-810C to the one or more server systems 804. Instances of the core software platform 704 (not shown in FIG. 8) can be executed in a distributed manner across the server systems 804. A user can access the software delivery architecture across the network using a thin client, such as for example a web browser or the like, or other portal software running on a client machine. The application server 802 can access data and data objects stored in one or more metadata repositories 716 which can make one or more of metadata and other data available for use by at least one of the one or more core software platform modules 704 and the database functionality or other software functionality provided by one or more external service providers 706. The application server 802 can also serve as a middleware component via which access is provided to one or more external software components 706 that can be provided by third party developers.

As in the standalone system 700 of FIG. 7, an adaptable business object module 712 or multiple such modules can execute on the computing system 702, on one or more separate systems, or any combination thereof to perform as discussed elsewhere herein. The adaptable business object module 712 can access a metadata repository 716, which, as noted above, can be part of or directly accessible to the application server 802, or, alternatively or in addition, can be located remotely or optionally spread over one or more physical or virtual servers, for example as in a cloud computing arrangement. The adaptable business object module or modules 712 can execute on the application server 802, on one or more separate application servers, or any combination thereof to perform one or more of the operations discussed in greater detail above. The metadata repository 716 can store metadata similar to that discussed above in reference to FIG. 7.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 802 that includes multiple server systems 804 that handle processing loads distributed by a load balancer 812. Potential benefits from such an arrangement can include, but are not limited to, high and reliably continuous application server availability and minimization of unplanned downtime, phased updating of the multiple server systems 804 to permit continuous availability (one server system 804 can be taken offline while the other systems continue to provide services via the load balancer 812), scalability via addition or removal of a server system 804 that is accessed via the load balancer 812, and de-coupled life cycle events or processes (such as for example system maintenance, software upgrades, etc.) that enable updating of the core software independently of tenant-specific customizations implemented by individual tenants.

As in the example illustrated in FIG. 7, the repository 716 can store a business object that represents a template definition of a standard business process. Each individual tenant 810A-810C can customize that standard template according to the individual business process features specific to business of the organization to which that tenant is assigned. Customizations can be stored as extensions in the metadata repository.

Figure 9:
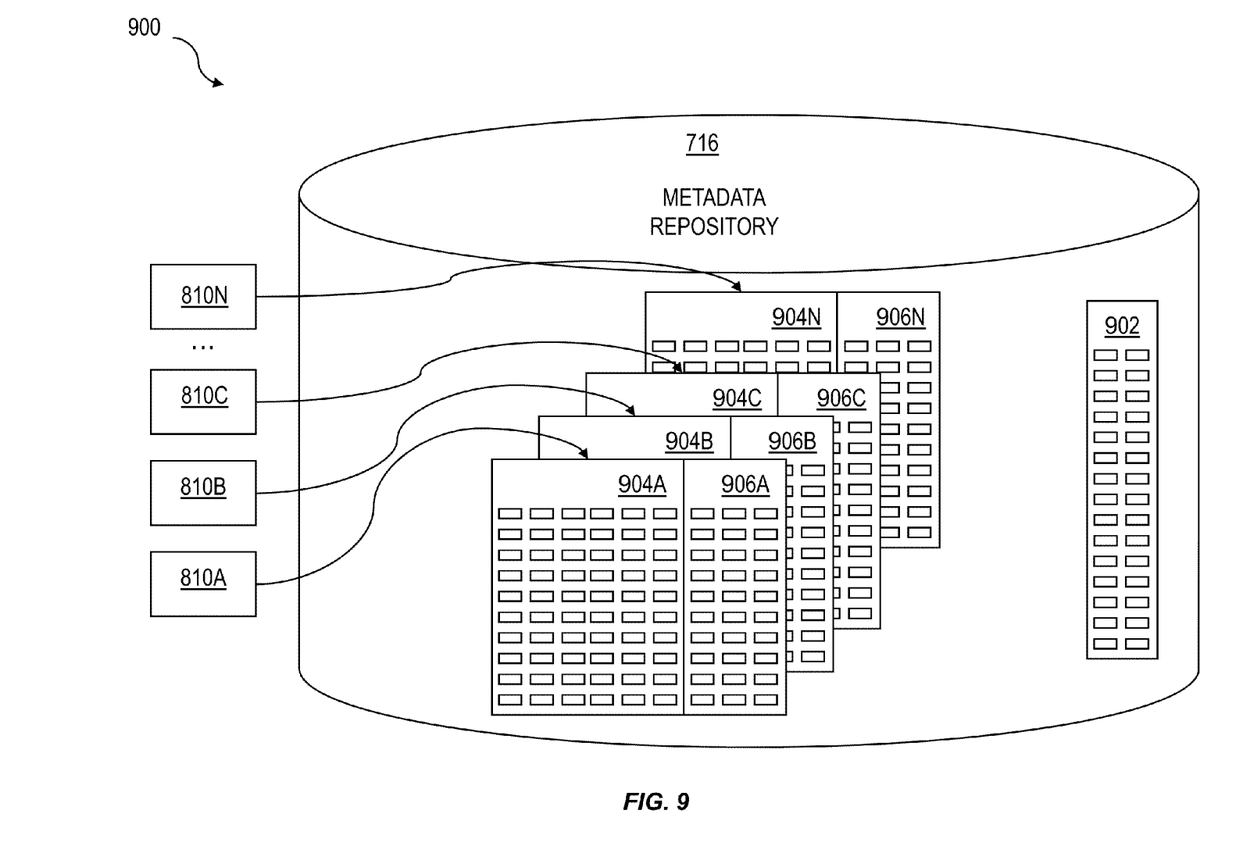
FIG. 9 is a diagram illustrating aspects of a repository showing features consistent with implementations of the current subject matter.

To provide for customization of the business process for each of multiple organizations supported by a single software delivery architecture 800, the data and data objects stored in the metadata repository 716 and/or other data repositories that are accessed by the application server 802 can include three types of content as shown in FIG. 9: core software platform content 902 (e.g. a standard definition of a business process), system content 904, and tenant content 906. Core software platform content 902 includes content that represents core functionality and is not modifiable by a tenant. System content 904 can in some examples be created by the runtime of the core software platform and can include core data objects that store concrete data associated with specific instances of a given business process and that are modifiable with data provided by each tenant. Metadata relating to one or more of core software platform content 902, system content 904, and content provided by the one or more external service providers 706 can optionally be part of a system tenant that is accessible from all other tenants 810A-810N.

The data and/or the metadata retained in the tenant content 906 can be tenant-specific: for example, each tenant 810A-810N can store information about its own inventory, sales orders, etc. as well as metadata pertaining to extensions, processes, or the like that are specific to the organization assigned to that tenant. Tenant content 906A-906N can therefore include data objects or extensions to other data objects that are customized for one specific tenant 810A-810N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 906 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 902 and system content 904 and tenant content 906 of a specific tenant are accessed to provide the business process definition and/or the status information relating to a specific instance of the business process according to customizations and business data of that tenant such that each tenant is provided access to a customized solution whose data are available only to users from that tenant.

One or more life cycle events or processes of an application server 702 can cause invalidation of the metadata retained in a buffer. A life cycle event in this context can refer to one or more of an import, an upgrade, a hot fix, or the like of one or more business objects or other data objects into a core software platform module 704 of a business software architecture or the database functionality or other software functionality provided by one or more external service providers 706. In the example of a multi-tenant approach such as described above in reference to FIG. 8 and FIG. 9, life cycle events affecting features of one or more core software platform modules 704 or of database functionality or other software functionality provided by one or more external service providers 706 can be performed in the system tenant. Similarly, other life cycle events that affect multiple tenants (e.g. scalable add-ons that can be active in multiple tenants) can also be performed on the system tenant. Life cycle events that affect only one tenant, for example upgrading, importing, hot fixing, etc. of an add-on or other custom feature that is used by only a single customer of the business software architecture; switching on or of a scalable add-on functionality for a single tenant; creating or modifying an extension to core software platform content 902, system content 904, or database functionality or other software functionality provided by one or more external service providers 706; or the like can be implemented only in the affected tenant.

Adaptable business objects such as are described herein can provide good compatibility with life cycle management events, such as for example upgrades, hot fixes, releases of new developments, transitions to new systems, or the like. Customer adaptations to an adaptable business object generally include terminology adaptations, which can be stored in a client dependent table, and field extensions, which can be stored as conventional field extensions in the system. Accordingly, even in a multi-tenant system, complete life cycle support can be available for these objects, including but not limited to full support of tenant isolation, copying of the adapted business object(s) from a test or shadow system to a productive system, life cycle stability of the extensions even when changes occur to the implementation of the adaptable business objects in the core software platform, and the like.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory machine-readable medium storing instructions that, when executed by at least one programmable processor, cause the at least one programmable processor to perform operations comprising:
 accessing, in response to a selection from a user of a business software architecture of an option to create a new business object, an adaptable business object, the adaptable business object comprising a generic, content-free, and meaning-free skeleton business object;
 receiving, from the user via a field extensibility user interface, definitions of a first field to be added to a header of the adaptable business object and a second field to be added to an item node of the adaptable business object;
 adapting, using a terminology tool accessed by the user via the field extensibility user interface tool, terminology of the adaptable business object, the adapting comprising storing metadata relating to the terminology, including the first field and the second field, in a metadata repository; and
 determining, at runtime using the stored metadata, screen and section titles for at least one user interface screen supported by the new business object.

2. A computer program product as in claim 1, wherein the adaptable business object comprises at least one of a peripheral feature and a peripheral function to cause the new business object to behave at runtime as though it were a standard business object provided with a core software platform of the business software architecture.

3. A computer program product as in claim 2, wherein the at least one peripheral feature and peripheral function is selected from a user interface (UI), a search form, a print form, a report, a migration service, a Web service, and an extension scenario.

4. A computer program product as in claim 1, wherein the adaptable business object comprises an identifier field adaptable by the user to create a link between the new business object and at least one of a second new business subject created from a second adaptable business subject and a standard business object included as part of a core software platform of the business software architecture.

5. A computer program product as in claim 1, wherein the adaptable business object comprises a field extensibility capability such that the new business object is extendible by using a field extensibility mechanism provided by the business software architecture for standard business objects provided with a core software platform of the business software architecture.

6. A computer program product as in claim 1, wherein the adaptable business object comprises a user interface providing a user interface anchor to allow addition by the user or another user at a business software architecture customer of an extension field that resolves to a corresponding underlying data structure within the new business object created from the adaptable business object.

7. A system comprising:
 at least one programmable processor; and
 a machine-readable medium storing instructions that, when executed by the at least one programmable processor, cause the at least one programmable processor to perform operations comprising:
 accessing, in response to a selection from a user of a business software architecture of an option to create a new business object, an adaptable business object, the adaptable business object comprising a generic, content-free, and meaning-free skeleton business object;
 receiving, from the user via a field extensibility user interface, definitions of a first field to be added to a header of the adaptable business object and a second field to be added to an item node of the adaptable business object;
 adapting, using a terminology tool accessed by the user via the field extensibility user interface tool, terminology of the adaptable business object, the adapting comprising storing metadata relating to the terminology, including the first field and the second field, in a metadata repository; and
 determining, at runtime using the stored metadata, screen and section titles for at least one user interface screen supported by the new business object.

8. A system as in claim 7, wherein the adaptable business object comprises at least one of a peripheral feature and a peripheral function to cause the new business object to behave at runtime as though it were a standard business object provided with a core software platform of the business software architecture.

9. A system as in claim 8, wherein the at least one peripheral feature and peripheral function is selected from a user interface (UI), a search form, a print form, a report, a migration service, a Web service, and an extension scenario.

10. A system as in claim 7, wherein the adaptable business object comprises an identifier field adaptable by the user to create a link between the new business object and at least one of a second new business subject created from a second adaptable business subject and a standard business object included as part of a core software platform of the business software architecture.

11. A system as in claim 7, wherein the adaptable business object comprises a field extensibility capability such that the new business object is extendible by using a field extensibility mechanism provided by the business software architecture for standard business objects provided with a core software platform of the business software architecture.

12. A system as in claim 7, wherein the adaptable business object comprises a user interface providing a user interface anchor to allow addition by the user or another user at a business software architecture customer of an extension field that resolves to a corresponding underlying data structure within the new business object created from the adaptable business object.

13. A computer-implemented method comprising:
 accessing, in response to a selection from a user of a business software architecture of an option to create a new business object, an adaptable business object, the adaptable business object comprising a generic, content-free, and meaning-free skeleton business object;
 receiving, from the user via a field extensibility user interface, definitions of a first field to be added to a header of the adaptable business object and a second field to be added to an item node of the adaptable business object;

adapting, using a terminology tool accessed by the user via the field extensibility user interface tool, terminology of the adaptable business object, the adapting comprising storing metadata relating to the terminology, including the first field and the second field, in a metadata repository; and determining, at runtime using the stored metadata, screen and section titles for at least one user interface screen supported by the new business object.

14. A computer-implemented method as in claim 13, wherein the adaptable business object comprises at least one of a peripheral feature and a peripheral function to cause the new business object to behave at runtime as though it were a standard business object provided with a core software platform of the business software architecture.

15. A computer-implemented method as in claim 14, wherein the at least one peripheral feature and peripheral function is selected from a user interface (UI), a search form, a print form, a report, a migration service, a Web service, and an extension scenario.

16. A computer-implemented method as in claim 13, wherein the adaptable business object comprises an identifier field adaptable by the user to create a link between the new business object and at least one of a second new business subject created from a second adaptable business subject and a standard business object included as part of a core software platform of the business software architecture.

17. A computer-implemented method as in claim 13, wherein the adaptable business object comprises a field extensibility capability such that the new business object is extendible by using a field extensibility mechanism provided by the business software architecture for standard business objects provided with a core software platform of the business software architecture.

18. A computer-implemented method as in claim 13, wherein the adaptable business object comprises a user interface providing a user interface anchor to allow addition by the user or another user at a business software architecture customer of an extension field that resolves to a corresponding underlying data structure within the new business object created from the adaptable business object.

19. A computer-implemented method as in claim 13, wherein at least one of the accessing, the receiving, the adapting, and the determining is performed by a system comprising at least one programmable processor.

* * * * *